(12) United States Patent
Muhle (10) Patent No.: US 10,288,063 B2
(45) Date of Patent: *May 14, 2019

(54) FLOW RESTRICTOR AND GAS COMPRESSOR

(71) Applicant: Whirlpool S.A., Sao Paulo (BR)

(72) Inventor: Henrique Bruggmann Muhle, Joinville (BR)

(73) Assignee: Whirlpool S.A. (BR)

( * ) Notice: Subject to any disclaimer, the term of this patent is extended or adjusted under 35 U.S.C. 154(b) by 417 days.

This patent is subject to a terminal disclaimer.

(21) Appl. No.: 14/766,372

(22) PCT Filed: Feb. 6, 2014

(86) PCT No.: PCT/BR2014/000035
§ 371 (c)(1),
(2) Date: Aug. 6, 2015

(87) PCT Pub. No.: WO2014/121361
PCT Pub. Date: Aug. 14, 2014

(65) Prior Publication Data
US 2015/0362112 A1    Dec. 17, 2015

(30) Foreign Application Priority Data

Feb. 7, 2013    (BR) ...................... 10 2013 003056 2

(51) Int. Cl.
*F04B 35/04*    (2006.01)
*F04B 39/02*    (2006.01)
(Continued)

(52) U.S. Cl.
CPC .......... *F04B 53/008* (2013.01); *F04B 35/045* (2013.01); *F04B 39/0292* (2013.01);
(Continued)

(58) Field of Classification Search
CPC .... F04B 35/04; F04B 53/008; F04B 39/0292; F04B 39/126; F04B 53/18; F04B 53/1077;
(Continued)

(56) References Cited

U.S. PATENT DOCUMENTS 2,683,636 A * 7/1954 Wilcox ............... F16C 32/0651
29/898.02
2,907,304 A * 10/1959 Macks ................ F15B 15/1428
184/18
(Continued)

FOREIGN PATENT DOCUMENTS

| WO | WO 2008/055809 A1 | 5/2008 |
| WO | WO 2013/071382 A2 | 5/2013 |
| WO | WO 2013/071383 A1 | 5/2013 |

OTHER PUBLICATIONS

International Search Report dated May 19, 2014 for International application No. PCT/BR2014/000035.
(Continued)

Primary Examiner — Alexander B Comley
(74) Attorney, Agent, or Firm — Fay Sharpe LLP (57) ABSTRACT

A flow restrictor is adapted for application in a bearing arrangement between a piston and a cylinder of a gas compressor. The compressor includes a protective block that involves the cylinder externally, and also includes at least one inner cavity, which is fluidly fed by a discharge flow resulting from a compression movement exerted by the piston inside the cylinder. The compressor includes a bearing-arrangement clearance that separates the piston and an inner wall of the cylinder. The compressor includes at least one flow restrictor provided with a housing that associates fluidly the inner cavity to the bearing-arrangement clearance. The flow restrictor is associated to the housing by a process of at least partial plastic deformation inside the
(Continued)

housing, the flow restrictor being provided with channels for passage of fluid, the plastic deformation being sized for limiting the gas flow through the inner cavity to the bearing-arrangement clearance.

6 Claims, 6 Drawing Sheets (51) Int. Cl.
F04B 39/10 (2006.01)
F04B 39/12 (2006.01)
F04B 53/00 (2006.01)
F04B 53/10 (2006.01)
F04B 53/14 (2006.01)
F16L 55/027 (2006.01)

(52) U.S. Cl.
CPC ............ F04B 39/10 (2013.01); F04B 39/122 (2013.01); F04B 39/123 (2013.01); F04B 39/126 (2013.01); F04B 53/1077 (2013.01); F04B 53/14 (2013.01); F16L 55/027 (2013.01)

(58) Field of Classification Search
CPC ........ F04B 39/123; F04B 39/10; F04B 53/14; F04B 39/122; F04B 35/045; F16C 29/025; F16C 32/0614–0625
USPC ................................ 417/417; 384/12; 92/127
See application file for complete search history.

(56) References Cited

U.S. PATENT DOCUMENTS

| | | | | | |
|---|---|---|---|---|---|
| 3,001,609 | A | * | 9/1961 | Macks | F16C 29/025 184/18 |
| 3,070,407 | A | * | 12/1962 | Hughes | F16C 32/0622 384/112 |
| 3,777,722 | A | * | 12/1973 | Lenger | F04B 31/00 123/193.2 |
| 4,045,098 | A | * | 8/1977 | Blondeel | B65G 51/03 384/104 |
| 4,366,993 | A | * | 1/1983 | Ono | F16C 32/0622 384/120 |
| 4,690,572 | A | * | 9/1987 | Sasaki | F01D 25/22 137/110 |
| 4,749,283 | A | * | 6/1988 | Yokomatsu | F16C 29/025 384/12 |
| 5,525,845 | A | * | 6/1996 | Beale | F02G 1/0435 310/12.27 |
| 6,293,684 | B1 | | 9/2001 | Riblett | |
| 6,901,845 | B2 | * | 6/2005 | Kiikka | F02G 1/0435 384/7 |
| 7,913,613 | B2 | * | 3/2011 | Muth | F04B 35/045 92/169.1 |
| 8,601,935 | B2 | * | 12/2013 | Giacchi | F04B 35/045 92/153 |
| 8,714,075 | B2 | * | 5/2014 | Giacchi | B23K 26/0626 92/169.1 |
| 2004/0154468 | A1 | * | 8/2004 | Kiikka | F02G 1/0435 92/162 R |
| 2006/0147130 | A1 | * | 7/2006 | Ruijl | F16C 29/025 384/12 |
| 2008/0118375 | A1 | * | 5/2008 | Muth | F02G 1/0435 417/363 |
| 2009/0238701 | A1 | * | 9/2009 | Giacchi | F04B 39/16 417/321 |
| 2009/0301293 | A1 | * | 12/2009 | Bechtold | F04B 35/045 92/127 |
| 2010/0021323 | A1 | * | 1/2010 | Schubert | F04B 35/045 417/416 |
| 2010/0046862 | A1 | * | 2/2010 | Schubert | F04B 35/045 384/12 |
| 2010/0098356 | A1 | * | 4/2010 | Giacchi | F04B 39/0005 384/12 |
| 2010/0218548 | A1 | * | 9/2010 | Giacchi | F04B 35/045 62/498 |
| 2010/0229717 | A1 | * | 9/2010 | Schubert | F04B 35/045 92/170.1 |
| 2010/0247308 | A1 | * | 9/2010 | Giacchi | B23K 26/0626 415/229 |

OTHER PUBLICATIONS

Written Opinion dated Feb. 23, 2015 for International application No. PCT/BR2014/000035.
International Preliminary Report on Patentability completed May 21, 2015 for International application No. PCT/BR2014/000035.

* cited by examiner

FLOW RESTRICTOR AND GAS COMPRESSOR

The present invention relates to a restricting element deformably configured to provide limitation and/or control in the gas flow, used in bearing arrangement between a piston and a gas-compressor cylinder.

The present invention also relates to a gas compressor comprising at least one restricting element as mentioned above.

DESCRIPTION OF THE PRIOR ART

At present, it is quite common to use piston-and-cylinder assemblies driven by electric motors for employ on gas compressors of cooling equipment such as household/commercial/industrial refrigerators, generators and air-conditioners.

In these types of compressors, the electric motor drives the piston, which in turn moves inside the cylinder in a axial alternating motion so as to compress the gas. Usually, at the cylinder head are positioned gas-suction and gas-discharge valves that regulate, respectively, the entry of low-pressure gas and the exit of high-pressure gas in the cylinder. Thus, the axial motion of the piston inside the compressor cylinder carries out the compression of the gas admitted by the suction valve, increasing the pressure thereof in order to lead the gas flow through the discharge valve to a high-pressure region.

One of the technical challenges observed in this type of gas compressor is preventing direct contact between the piston and the cylinder. Thus, due to the relative movement between piston and cylinder, it is necessary to make a bearing arrangement by means of a fluid disposed in the clearance between these two parts, preventing the premature wear thereof. The presence of the fluid between the piston and the cylinder also provides decrease in the friction between them, which enables one to reduce mechanical loss of the compressor.

Linear compressors often use a type of bearing arrangement known as aerostatic bearing arrangement, which consists of the conception of gas mattress between the piston and the cylinder, preventing any contact between them. The sue of an aerostatic bearing arrangement is advantageous over other types of bearing arrangement, because, since gas has a quite lower viscosity friction than oil, the energy dissipated for bearing arrangement is less, which contributes to the better output of the compressor. Another advantage of using the gas itself as lubricating fluid consists of the absence of the need to use an oil pumping system.

It should be noted that the gas used for bearing arrangement may consist of a portion of the gas itself that is pumped by the compressor and used in the cooling system, which is diverted after its compression toward the clearance existing between the piston and the cylinder, forming a gas mattress that prevents contact between them. In this regard, one observes that the whole gas used in bearing arrangement represents a loss in compressor efficiency, since the main function of the compressed gas is the direct application thereof in the cooling system for generating cold. Thus, the portion of gas volume diverted for bearing arrangement should be as small as possible, ion order not to impair the efficiency of the compressor in a significant manner.

Usually, in order to obtain an effective functioning of an aerostatic bearing, it is necessary to use a flow restrictor capable of limiting the flow of compressed gas from a high-pressure region of the compressor, so that the pressure of gas present in the clearance between the piston and the cylinder will be lower and suitable for the application. In other words, such restriction aims at enabling reduction or control of the pressure in the bearing-arrangement region by restricting the flow of compressed gas from the high-pressure region of the compressor.

Various constructive configurations have already been developed to enable the conception of restrictors to provide reduction of pressure in the bearing-arrangement region.

For example, U.S. Pat. No. 6,901,845 describe a restrictor that comprises a porous means in which the porous tape is use in conjunction with compression rings. A disadvantage of this configuration lies in the need for precision in manufacturing the compression rings, which renders the production process expensive, besides the difficulty of dimensional control.

U.S. Pat. No. 6,293,684 discloses restrictors formed by microchannels arranged close to the outer cylinder wall, which, in conjunction with a sleeve into which said cylinder is inserted, form closed and isolated channels, giving rise to a plurality of restrictors. Like the case of the patent mentioned before, a disadvantage of this type of configuration lies in the need for precision ion manufacturing the sleeves, which raises the manufacture costs.

International patent application WO 2008/055809 describes restrictors that consist of microbores arranges in the cylinder wall, made by applying laser beam. Again, making the microbores requires much precision, which may renter the production of compressors with competitive costs on the market unfeasible.

Thus, no satisfactory and efficient solution has yet been created for providing restriction in the flow of gas used in the bearing arrangement between a piston and gas-compressor cylinder that exhibits good reliability and satisfactory performance, and that is inexpensive and easy to manufacture and apply.

OBJECTIVES OF THE INVENTION

A first objective of the present invention is to provide a low-cost flow restrictor, achieved through plastic deformation of a metallic bushing by the mechanical compression process, which may be reproduced and controlled easily in industrial manufacture configurations. This restrictor should be configured in accordance with the deformation undergone by the bushing, so as to enable the consequent and proportional limitation and/or control of the flow and of the pressure of the gas used in the bearing arrangement between a piston and a gas-compressor cylinder, reducing or preventing loss of efficiency of said gas compressor, so as to achieve optimum performance.

A second objective of the present invention is to provide a flow restrictor capable of enabling deviation of at least a portion of the flow of gas compressed by a gas compressor to a bearing arrangement between its piston and cylinder, without impairing the structural integrity or the efficiency of said gas compressor in a significant way, through channels for passage of fluid, such as bores, cracks, cavities, pores or the like, present along the length of the bushing used as a flow restrictor.

A third objective of the present invention is to provide a gas compressor comprising a flow restrictor according to any combination of the above-mentioned objectives.

BRIEF DESCRIPTION OF THE INVENTION

A way to achieve the first and second objectives of the present invention is by providing a flow restrictor for application in bearing arrangement between piston and cylinder of a gas compressor. Such gas compressor comprises at least one protective block that involves the cylinder externally. Besides, the gas compressor also comprises at least one internal cavity, arranged between the protective block and the cylinder, fluidly fed by a discharge flow resulting from a compression movement exerted by the piston inside the cylinder. Additionally, the gas compressor further comprises at least one bearing-arrangement clearance that separates an external piston wall and an internal cylinder wall. Further, the gas compressor also comprises at least one flow restrictor provided with a housing that associates the cavity in the bearing-arrangement clearance. Such flow restrictor comprises a bushing associated to the compressor housing by at least one process of plastic deformation of the bushing inside this housing, this bushing being provided with channels for passage the fluid, the plastic deformation being sized so as to limit the gas flow from the cavity in the bearing-arrangement.

It is possible to point out also various alternative forms of achieving the objectives mentioned before, which comprise minor complementary variations that illustrate alternative embodiments of the present invention that will be presented later.

Thus, the restrictor may be manufactured by flattening a bushing, also considering that this flattening may produce a partial deformation, or even a total deformation of the bushing, which may be made by one or two tools counterposing the movement of each other.

This restrictor may also be manufactured from a metallic material, be it aluminum, tin, copper, bronze or brass, which may also exhibit a significant porosity. In order to manufacture this bushing, however, it would not be necessary to control the porosity accurately, since the bushing deformation itself reduces the pores down to a point where the gas-flow rate through the bushing reached the desired value.

In addition, said channels with the function of enabling passage of fluid from the cavity in the bearing-arrangement clearance may be obtained from a plurality of structures such as straight grooves, helical grooves, serration, inner thread or simply through a slot, bore or cavity of cylindrical or conical shape.

The third objective of the present invention is achieved by providing a gas compressor that comprises a cylinder, a piston that reciprocated inside the cylinder and a flow restrictor according to the first or second manner described above.

BRIEF DESCRIPTION OF THE DRAWINGS

The present invention will now be described in greater detail with reference to the attached drawings, in which.

DETAILED DESCRIPTION OF THE FIGURES

Figure 1:
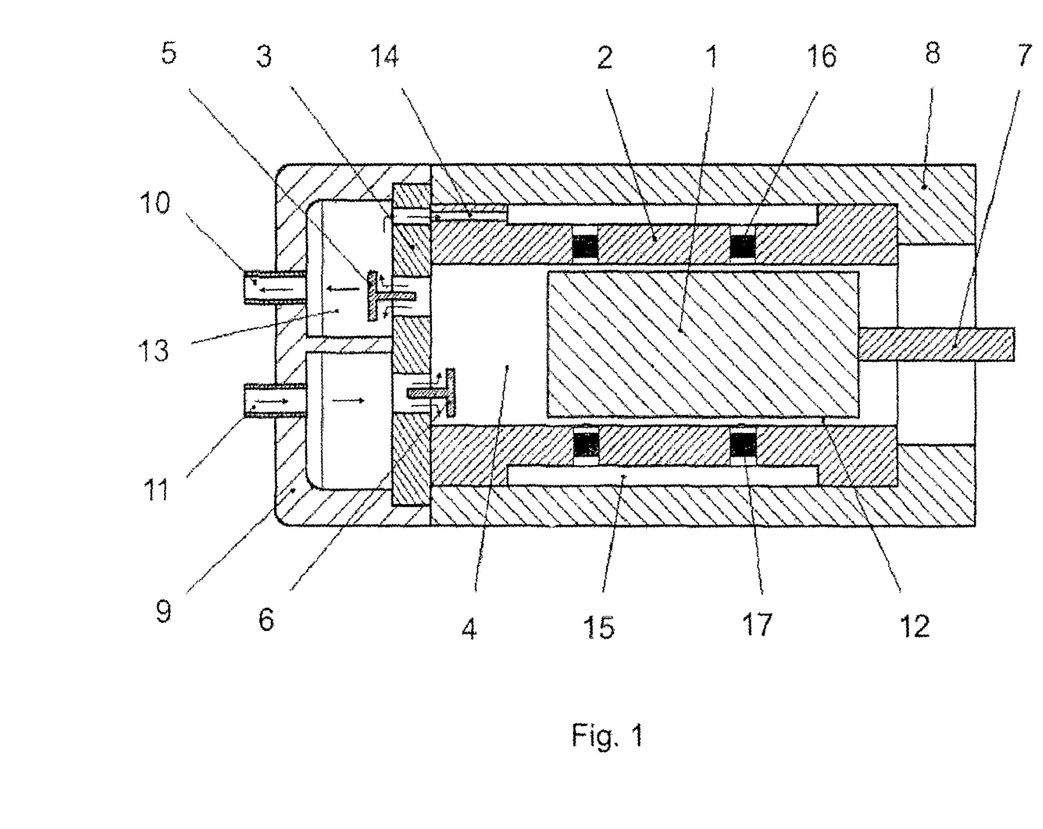
FIG. 1 represents a side-section view of a gas compressor according to the present invention, which comprises a first preferred embodiment of a flow restrictor, also object of the present invention, when the suction valve is in the open state.

FIG. 1 illustrates a gas compressor of the linear type according to a preferred embodiment of the present invention.

Such a gas compressor comprises at least one piston 1, one cylinder 2 and one head 3 positioned at the top or bottom, forming, in conjunction with the piston 1 and the cylinder 2, a compression chamber 4, the axial and oscillating movement of the piston 1 inside the cylinder 2 providing gas compression in the compression chamber 4.

As can be seen in FIG. 1, the gas compressor is also provided with at least one suction valve 6 and a discharge valve 5, positioned at the head 3, which regulate the entry and the exit of gas from the compression chamber 4. The gas compressor is also provided with an actuator 7, associated to a linear motor, capable of actuating the piston 1. In other words, the piston 1, actuated by said linear motor, has the function of developing a linear alternating motion, which enables movement of the piston 1 inside the cylinder 2, so as to provide an action of compressing the gas admitted through the suction valve 6, until it can be discharged to the high-pressure side through the discharge valve 5.

The gas compressor is also provided with a discharge passer 10 and a suction passer 11, positioned at a cover 9, which connect the gas compressor with the other parts, pieces and components of a cooling system.

Besides, the gas compressor also comprises at least one protective block 8, which involves the cylinder 2 externally.

Additionally, the gas compressor comprises at least one inner cavity 15, arranged between the protective block 8 and the cylinder 2, fluidly fed by a discharge flow resulting from the compression movement exerted by the piston 1 inside the cylinder 2. The inner cavity 15 is formed by the outer diameter of the cylinder 2 and by the inner diameter of the protective block 8.

Further, the gas compressor comprises at least one bearing-arrangement clearance 12, which separates an outer wall of the piston 1 and an inner wall of the cylinder 2, as shown in FIG. 1. The gas used for the bearing arrangement consists preferably of the gas itself that is pumped by the gas compressor and used in the cooling system. This compressed gas is diverted from a discharge chamber 13 to the inner cavity 15 through a connection channel 14.

Figure 2:
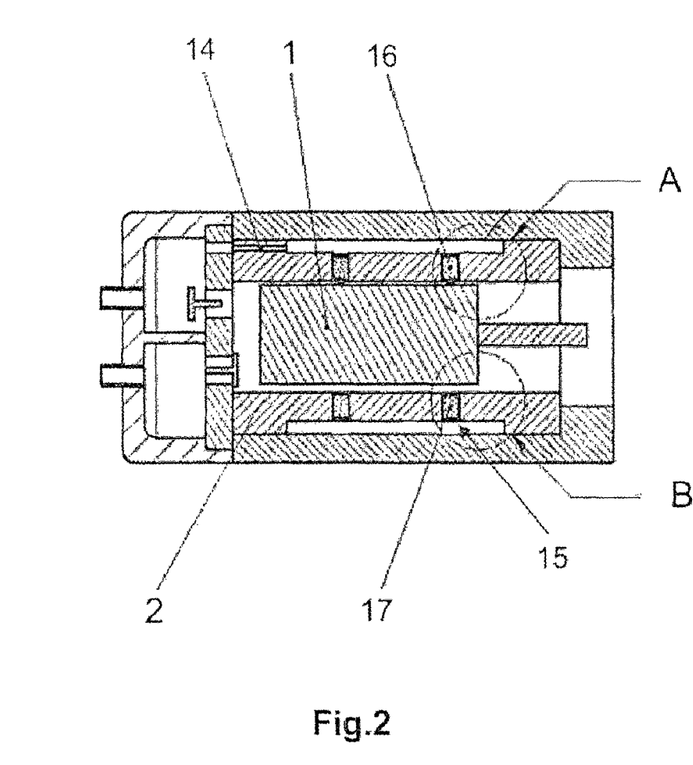
FIG. 2 represents a side-section view of the gas compressor illustrated in FIG. 1, when the suction valve is in the closed state.

The gas compressor comprises at least one flow restrictor 16, 17, also object of the present invention, provided with a housing that associates fluidly the inner cavity 15 to the bearing arrangement 12. The housing shape may be substantially cylindrical or substantially conical. As mentioned before, the function of the flow restrictor 16, 17 is to provide the bearing arrangement between the piston 1 and the cylinder 2 of the gas compressor. In other words, the flow restrictor 16, 17, arranged between the inner cavity 15 (high-pressure region) and the bearing arrangement 12, is capable of controlling the pressure in the bearing-arrangement region and restricting the gas flow. From FIGS. 2, 3, and 4 one can understand the functioning of the aerostatic material of the present invention. The inner cavity 15, connected to the discharge chamber 13 by the connection channel 14, presents gas with discharge pressure Pd, which feeds the flow restrictors 16, 17. This gas, upon passing through the flow restrictors 16, 17, loses pressure, forming a gas mattress of intermediate pressure Pi in the bearing-arrangement clearance 12. This is the pressure that supports the piston 1 and prevents it from resting against the inner wall of the cylinder 2. Finally, the gas flows out of the bearing-arrangement clearance 12, reaching a low pressure, which corresponds to the suction pressure Ps of the gas compressor.

Figure 3:
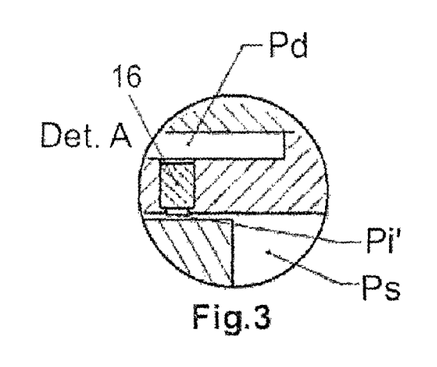
FIG. 3 represents a first detail of FIG. 2.
Figure 4:
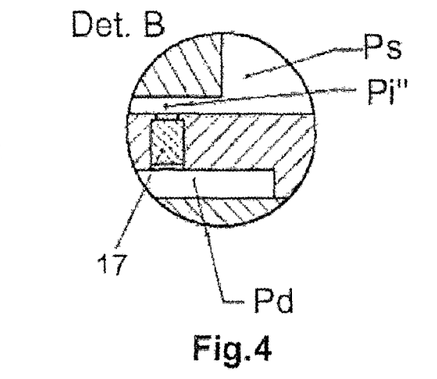
FIG. 4 represents a second detail of FIG. 2.

When the piston 1 undergoes some axial effort so as to approach the cylinder 2 wall and, as a result, for instance, the flow restrictor 16, the bearing-arrangement clearance 12 in the region decreases (FIG. 3: detail A). The decrease in the bearing-arrangement clearance 12 entails an increase in the loss of charge of gas flow in the region in which the latter flows between the piston 1 and the cylinder 2. This increase in loss of charge entails a decrease in gas-flow rate through the flow restrictor 16 and through the bearing-arrangement clearance in the region adjacent the flow restrictor 16. The decrease in flow rate implies a decrease in velocity of gas flow, which in turn entails a decrease in loss of charge in the flow restrictor 16. This reduction in loss of charge of gas flow that passes through the flow restrictor 16 enables the gas reaching the bearing-arrangement clearance 12 in the region of the flow restrictor 16 to reach a pressure Pi' higher than the intermediate pressure Pi. This increase in pressure acts to prevent the piston 1 from coming closer to the cylinder 2 wall in the region of the flow restrictor 16, preventing contact between the piston 1 and the cylinder 2.

On the other hand, in the opposite region of the bearing-arrangement clearance 12 (FIG. 4: detail B), the piston 1 moves away from the cylinder 2 wall and from the flow restrictor 17. The increase in the bearing-arrangement clearance 12 leads to the decrease in loss of charge of gas flow in the clearance region, increasing the gas-flow rate that passes through the clearance and through the flow restrictor 17. The increase in velocity of the gas flow increases the loss of charge of the flow in the flow restrictor 17, which causes the gas to reach the bearing-arrangement clearance 12 in the region of the flow restrictor 17 with a pressure Pi" lower than the intermediate pressure Pi. This decrease in the intermediate in the region of the flow restrictor 17 acts to reestablish the force balance of the bearing, preventing contact of the piston 1 with the wall in the opposite region of the cylinder 2.

The flow restrictor 16,17 called also bushing, is associated to the housing, being provided with at least one channel for passage of the bearing-arrangement fluid, representing a restrictive portion provided with a cross-section sized by deformation of the channel, to limit precisely the gas flow that flows from the inner cavity 15 to the bearing-arrangement clearance 12. In this way, the gas passes through at least one of these channels toward the bearing-arrangement clearance 12, forming a gas mattress that prevents contact between the piston 1 and the cylinder 2.

Thus, the principle of fixing and restricting gas flow consists in deforming plastically the flow restrictor 16, 17 with a tool that applies force F (represented by an arrow), pressing the flow restrictor 16, 17 against the bottom of the stepped bore. Since the deformation force F is applied so as to decrease the length of the flow restrictor 16, 17, the latter undergoes deformation in radial direction, which, as a result, causes a gradual decrease in the cross-sectional area of its channels or grooves or of the diameter of one or more of its bores. The decrease in cross-sectional area of the channels, of the grooves or of the bores entails greater loss of charge of gas flow that passes there, increasing the drop in pressure of said flow. In order to reach the desired flow rate/pressure, one can make a pre-established deformation or measure the flow rate during the deformation process, interrupting it when the desired flow rate has been reached.

Figure 5A:
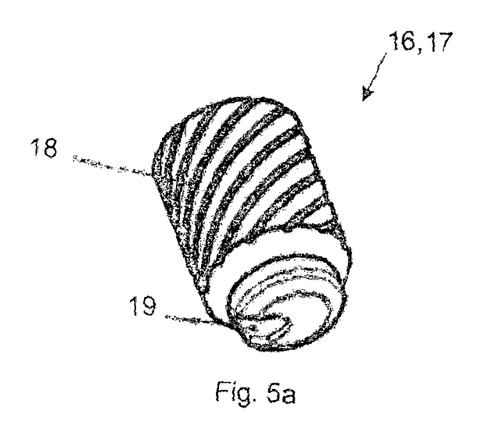
FIG. 5A represents a perspective view of a first preferred embodiment of the flow restrictor of the present invention.
Figure 5B:
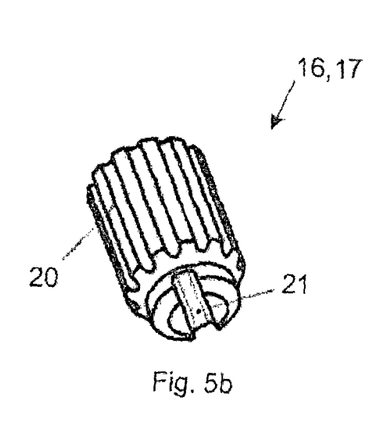
FIG. 5B represents a perspective view of a second preferred embodiment of the flow restrictor of the present invention.
Figure 5C:
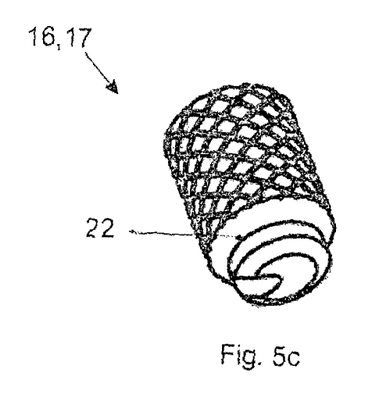
FIG. 5C represents a perspective view of a third preferred embodiment of the flow restrictor of the present invention.
Figure 5D:
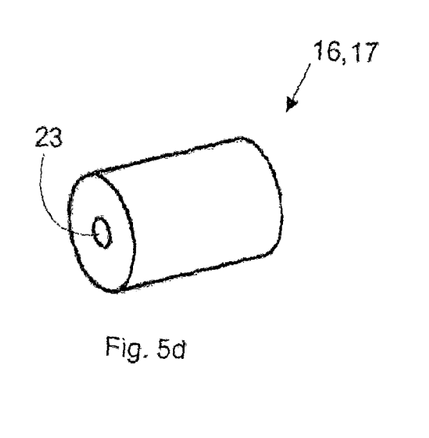
FIG. 5D represents a perspective view of a fourth preferred embodiment of the flow restrictor of the present invention.

A few possible preferred embodiments are illustrated in FIGS. 5A, 5B, 5C and 5D, in which one presents the embodiments in which the deformable flow restrictor 16, 17 has a surface finish applied to the outer surface of its structure, made in the form of helical grooves 18 with a cavity 19 for passage of gas (FIG. 5A), straight grooves 20 with a slot 21 (FIG. 5B), of serration 22 (FIG. 5C), or a simple bore 23 throughout the length of the bushing (FIG. 5D).

In should be noted that the present invention is not limited to the embodiments presented in the figures discussed above. So, the inventive concept lies in the capability of the plastic deformation of the flow restrictor 16, 17 and of its channels resting against the housing walls to guarantee control of the flow-rate of bearing-arrangement fluid. Concomitantly, this control obtained through the plastic deformation guarantees the association between the flow restrictors 16, 17 and the housing. In this way, one achieves great advantage in terms of industrial processing, since one manages to achieve excellent restriction characteristics with one simple process step.

Figure 6:
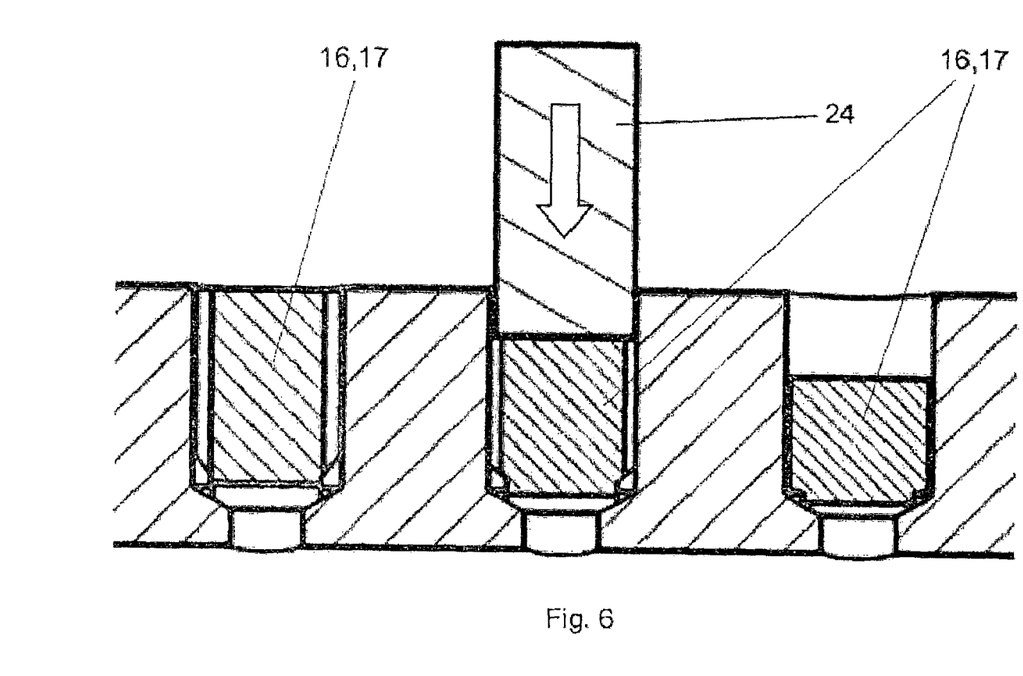
FIG. 6 represents a front-section view of a first preferred embodiment of the deformation made on the flow restrictor of the present invention.
Figure 7:
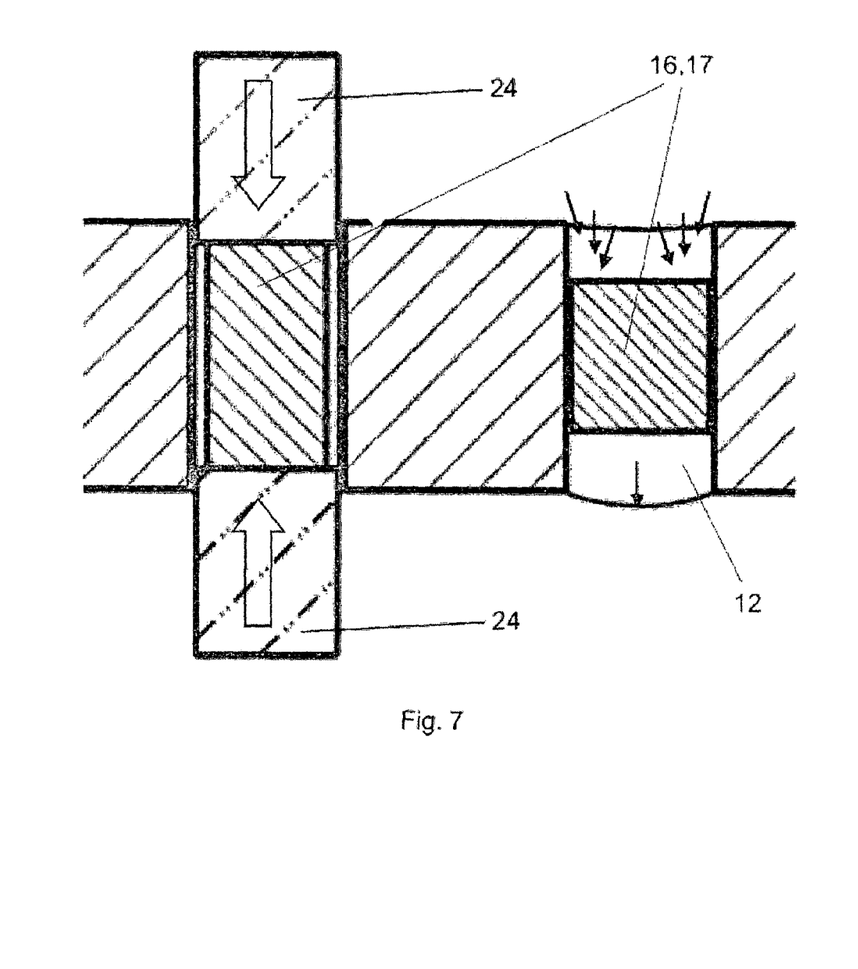
FIG. 7 represents a front-section view of a second preferred embodiment of the deformation made on the flow restrictor of the present invention.

FIGS. 6 and 7 show embodiment representations in which it is possible to obtain plastic deformation of the pushing by finish carried out in the housing itself of the compressor. In a first representation, illustrated in FIG. 6, a single tool 24 applies force (indicated by the arrow) directly to the bushing face that remains in contact with the cavity 15, deforming it permanently and controlling the gas-flow rate by adjusting the cross-sectional area available for passage of gas. In this case, the tool 24 is aided by a housing where one of the ends is obtained by a stepped bore.

A variation of this form of deforming the flow restrictor 16, 17 is illustrated ion FIG. 7, in which there is another tool 24 that exerts a force that counteracts the deformation force applied by the first tool 24, activating the stresses undergone by the compressor structure during the step of deforming the flow restrictor 16, 17.

Figure 8A:
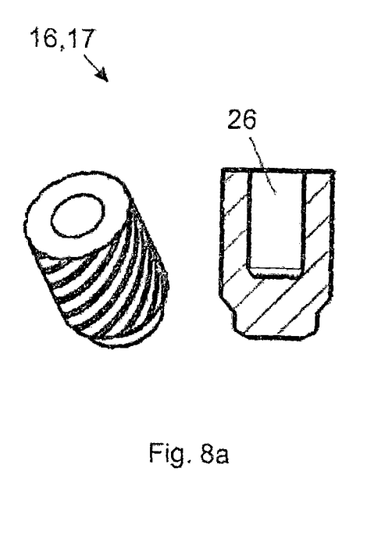
FIG. 8A represents a perspective view and a side-section view of a fifth preferred embodiment of the flow restrictor of the present invention.
Figure 8B:
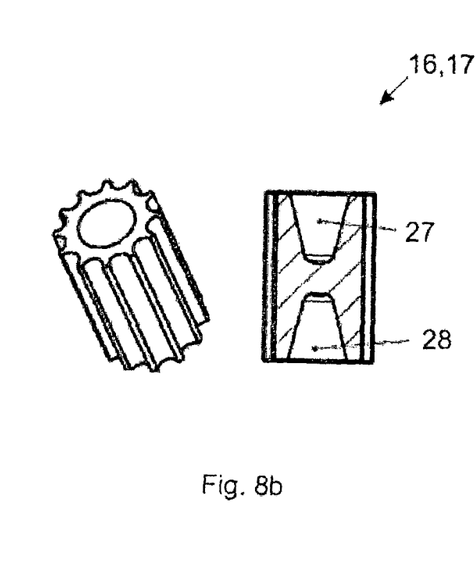
FIG. 8B represents a perspective view and a side-section view of a sixth preferred embodiment of the flow restrictor of the present invention.

Variations in the geometry of the bushing may be made in order to facilitate the deformation thereof and, as a result, decrease the force required to achieve the necessary plastic deformation. Thus, FIG. 8 presents the insertion of cavities 26, 27 and 28 in the bushing, so that less material will deform, preventing greater compressive loads. These cavities may have any shape, including cylindrical or conical.

Preferred examples of embodiments having being described, one should understand that the scope of the present invention embraces other possible variations, being limited only by the contents of the accompanying claims, which include the possible equivalents.

The invention claimed is:

1. A gas compressor comprising:
   a cylinder;
   a piston reciprocally movable within the cylinder;
   an inner cavity located outside the cylinder and fluidly fed with an aerostatic bearing fluid by a discharge flow resulting from a compression movement exerted by the piston within the cylinder;
   a bearing clearance that separates an outer wall of the piston and an inner wall of the cylinder;
   a housing bore provided through the inner wall of the cylinder and in fluid communication with the inner cavity, the housing bore providing fluid communication between the inner cavity and the bearing clearance;
   a bushing provided inside the housing bore;
   the bushing being made of a metallic material comprising at least one metal selected from the group of: aluminum, tin, copper, bronze, brass;
   said bushing comprising at least one passage channel defined in the bushing for flow of aerostatic bearing fluid through the at least one passage channel between the inner cavity and the bearing clearance;
   wherein the bushing and the at least one passage channel defined in the bushing are deformed relative to said housing bore such that said bushing is engaged with the cylinder and fixedly secured in said housing bore and said bushing provides a flow restrictor that restricts flow of aerostatic bearing fluid from the inner cavity into the bearing clearance through the housing bore.

2. The gas compressor as set forth in claim 1, wherein the at least one passage channel in the bushing comprises straight or helical grooves formed in an outer surface of the bushing along a length of the bushing such that said grooves and said housing bore cooperate to define flow passages between the bushing and the cylinder for the aerostatic bearing fluid to flow through the housing bore between the bushing and the cylinder from the inner cavity into the bearing clearance.

3. The gas compressor as set forth in claim 1, wherein the at least one passage channel in the bushing comprises a serration formed in an outer surface of the bushing along a length of the bushing such that said serration and said housing bore cooperate to define a passage for the aerostatic bearing fluid to flow through the housing bore between the bushing and the cylinder from the inner cavity into the bearing clearance.

4. The gas compressor as set forth in claim 1, wherein the at least one passage in the bushing comprises an inner thread throughout a length of the bushing such that said inner thread defines a passage for aerostatic bearing fluid to flow through the bushing from the inner cavity into the bearing clearance.

5. The gas compressor as set forth in claim 1, wherein the at least one passage in the bushing comprises at least one of a slot, a cavity, or a bore throughout a length of the bushing such that said at least one slot, cavity, or bore defines a passage for aerostatic bearing fluid to flow through the bushing from the inner cavity into the bearing clearance.

6. The gas compressor as set forth in claim 1, wherein the bushing further comprises at least one cavity of cylindrical or conical shape defined therein, wherein said cavity facilitates deformation of the bushing.

* * * * *